(No Model.)
C. J. HOLMAN.
WHEEL FOR VEHICLES.
No. 537,345. Patented Apr. 9, 1895.
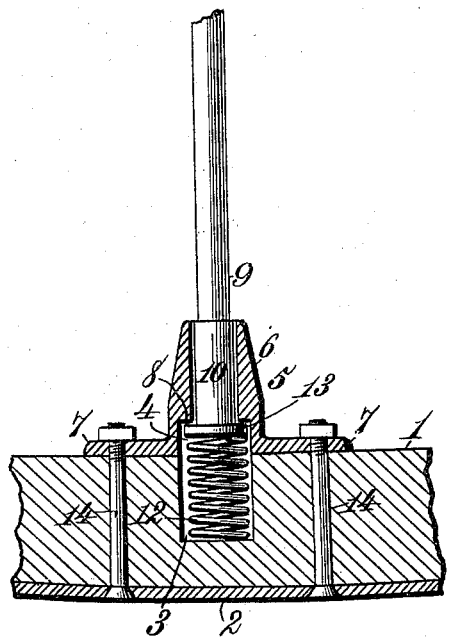
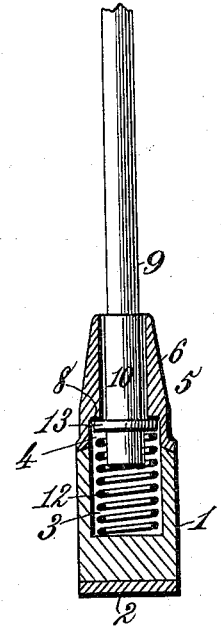
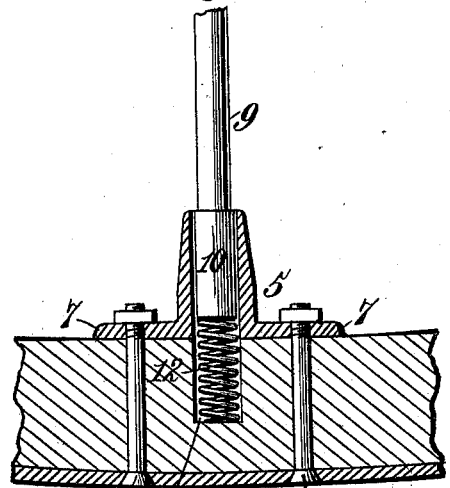
Witnesses.
Robert Everett,
G. W. Rea.
Inventor.
Calvin J. Holman.
By James L. Norris.
Atty.

UNITED STATES PATENT OFFICE.

CALVIN JAMES HOLMAN, OF CHICAGO, ILLINOIS.

WHEEL FOR VEHICLES.

SPECIFICATION forming part of Letters Patent No. 537,345, dated April 9, 1895.

Application filed June 25, 1894. Serial No. 515,641. (No model.)

*To all whom it may concern:*

Be it known that I, CALVIN JAMES HOLMAN, a citizen of the United States, residing at Chicago, in the county of Cook and State of Illinois, have invented new and useful Improvements in Wheels for Vehicles, of which the following is a specification.

My invention relates to wheels for vehicles and has for its object to improve the connection of the spokes with the felly in such manner as to impart greater elasticity and flexibility to a tension wheel, effect a more equable distribution of pressure and strain, to keep the wheel taut at all times and thereby largely increase its strength and durability.

The invention is applicable to wheels for carriages, buggies, sulkies and bicycles as well as for road wagons, farm wagons, trucks and vehicles of the larger sizes; and it consists in the features of construction and novel combination of devices hereinafter described and claimed.

In the annexed drawings illustrating the invention, Figure 1 is a partly sectional view of a portion of a vehicle wheel showing one form of the connection for the felly and spokes. Fig. 2 is a sectional view showing the outer end portion of the spoke extended into the space inclosed by the spiral spring which has one of its bearings on an annular shoulder formed around the spoke and near its outer end. Fig. 3 is a sectional view showing the spoke and its socket without shoulders.

Referring to the drawings, the numeral 1 designates the wooden felly and 2 the metal tire of a vehicle wheel.

In the felly, at suitable distances apart, are formed cylindrical recesses 3 that have open ends on the inner periphery of the felly but do not extend to its outer edge. Each of these recesses 3 is continuous with a similar recess 4, of like shape and diameter, formed in a metal socket 5 having a tubular shank 6 and provided with flanges 7 fitting the inner edge of the felly. The tubular socket shank 6 is of uniform internal diameter but may be made tapering on the outside.

If desired an internal annular shoulder 8 may be formed at the junction of the cylindrical recess 4 with the reduced bore of the tubular shank; or, if preferred, the internal diameter of the socket recess and shank may be uniform and without any shoulder.

The wheel spokes 9 are made of steel rods and may be secured to the hub in any suitable or well known manner. At its outer end each spoke is received in the tubular shank of one of the sockets on the felly. That portion of the spoke inclosed in the socket shank 6 is of enlarged diameter as shown at 10, the whole of the inclosed portion of the spoke being increased in diameter for a distance corresponding with the length of the tubular socket shank while the main portion of the spoke is reduced in diameter, as shown, so that the spoke and socket shank may have a slight play or sliding movement on each other without liability of abrading the spoke or rubbing off the paint from the reduced spoke body. The outer end of each spoke is pressed against by a spiral spring 12 supported partly in the recess 3 of the felly and partly in the recess 4 of the socket.

As shown in Fig. 1 the outer end of each spoke may be provided with a head or shoulder 13 against which one end of the spirally coiled spring 12 will bear, its other end having a bearing in the recess 3 of the felly. The spoke shoulder 13 is of the same diameter as the annular shoulder 8 at the bottom of the socket recess 4 and is pressed toward and against the same by the action of the spring.

Instead of forming the shoulder 13 directly on the outer spoke end the spoke may be extended outward and part way into the space inclosed by the spring, as shown in Fig. 2, and thereby act as a central support for the spring, which at the same time will have one of its bearings on the spoke shoulder 13 and its other in the recess 3 of the felly.

When the socket recess 4 and the bore of the socket shank 6 are of the same internal diameter, as shown in Fig. 3, the shoulders 8 and 13 will both be dispensed with and the spirally coiled spring 12 will rest directly against the end of the spoke.

It will be observed that the spiral spring 12 performs a two fold function in adding elasticity or flexibility to the wheel and at the same time imparting thereto a uniform tautness and a perfect compensating effect in the equal distribution of pressure and strain. A tension wheel requires to be kept taut at all times. If there is any excess of play the spoke sockets or clips at the felly are liable to break when sudden and heavy strain is brought on the wheel. The spring 12 is so arranged as to support the tension and relieve the strain and at the same time keep the wheel uniformly taut and impart the requisite elasticity and strength.

The attaching flanges 7 of the spoke sockets 5 may be concaved on one side to correspond with the convexity of the inner edge of the felly. These socket flanges 7 are secured to the felly by means of bolts 14 passed through the tire and felly and provided with nuts 15 on their inner ends.

I am aware that springs and cushions have been arranged in recesses of a felly and hub to form elastic bearings for the ends of the spokes and this, therefore, I do not broadly claim; but I am not aware that the ends of elastically supported spokes have been made of enlarged diameter for a length corresponding with the length of the socket shanks to protect the reduced main portions of the spokes and prevent the rubbing of paint therefrom in the endwise movements or play of such spokes. By this construction the spokes of a tension wheel may have the required elasticity and endwise movement without any risk of abrading or marring the paint adjacent to the spoke sockets, and the neat appearance of the wheel spokes may thus be preserved for a long time.

What I claim as my invention is—

In a vehicle wheel, the combination with the felly having a series of cylindrical recesses, and the spoke sockets secured to the felly and provided with tubular shanks, of the spokes having their outer end portions enlarged in diameter for a distance corresponding with the length of the socket shanks to prevent abrading the reduced body portions of the spokes adjacent to said sockets, and springs supported in the felly recesses and bearing against the felly and spokes, substantially as shown and described.

In testimony whereof I have hereunto set my hand and affixed my seal in presence of two subscribing witnesses.

CALVIN JAMES HOLMAN. [L. S]

Witnesses:
E. C. SCHWERDTFEG,
WILLIAM J. RATHJE.